Feb. 18, 1958    R. S. HARP ET AL    2,823,560
CONTROLLABLE MULTIPLE DRIVING MECHANISM
Filed Nov. 30, 1953
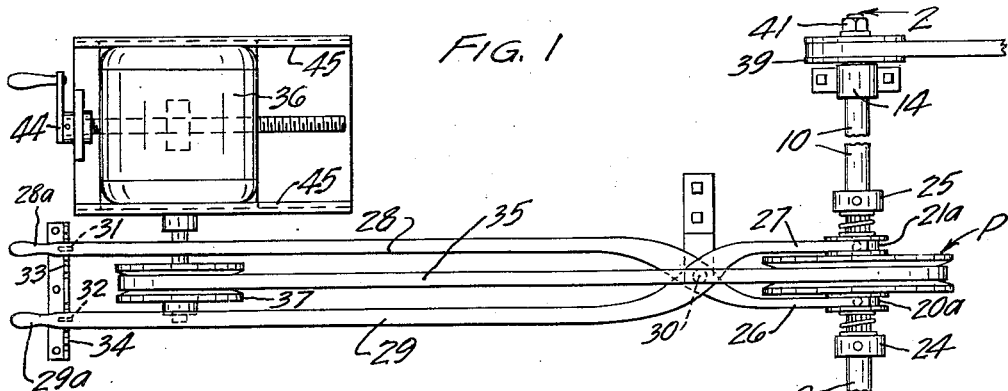
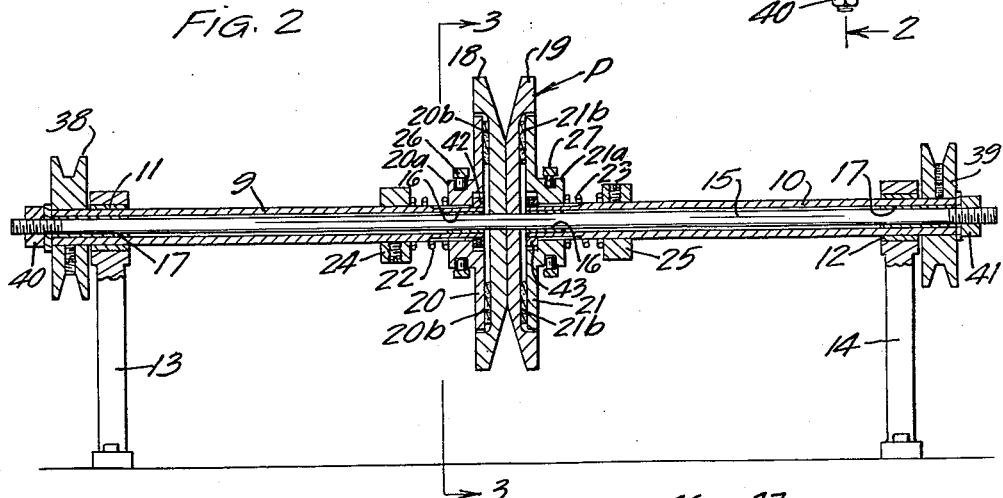
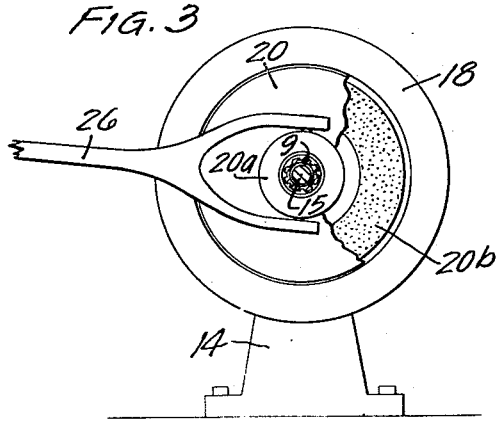
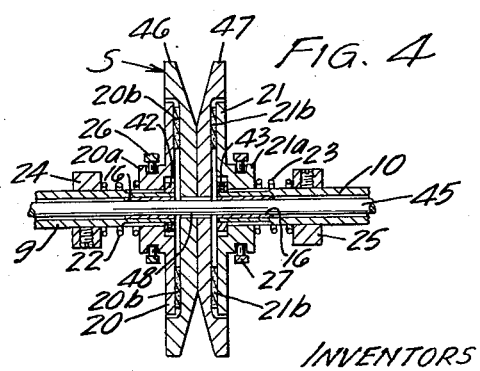
INVENTORS
RAY S. HARP
HAROLD P. HEINISCH
BY
Williamson, Williamson, Schroeder & Adams
ATTORNEYS

United States Patent Office 2,823,560
Patented Feb. 18, 1958

2,823,560

CONTROLLABLE MULTIPLE DRIVING MECHANISM

Ray S. Harp and Harold P. Heinisch, Minneapolis, Minn.

Application November 30, 1953, Serial No. 395,112

4 Claims. (Cl. 74—722)

This invention relates to a controllable multiple friction clutch driving mechanism particularly adapted for use where a differential type of drive is desirable.

It is an object of this invention to provide a novel and highly efficient, yet relatively inexpensive and simple, multiple driving connection for a pair of drive wheels such as are used on power lawn mowers and permitting said wheels to be rotated at different speeds.

It is another object of this invention to provide a split pulley belt drive whereby the driving speed of the pulley may be increased by increasing the tension on the belt driving mechanism and thus increasing the driving pressure exerted between the two friction drive surfaces.

It is still another object of this invention to provide a main rotary driving member having a friction driving connection with a pair of rotatable drive shafts with means for journalling the driving member and the drive shaft members to permit individual control of the rotation thereof and permit one to be rotated at a slower rate than the other.

It is a further object to provide a central mounting shaft with a pair of hollow drive shafts individually journalled thereon with a driving pulley disposed intermediate the two inner ends of said hollow drive shafts with a pair of disengageable spring-pressed friction clutch plates normally held in driving engagement with respectively opposite sides of said driving pulley and respectively provided with slidable driving connections to the inner ends of said hollow shafts and including controllable means for disengaging said spring-pressed clutch plates either simultaneously or individually.

It is still a further object to provide an alternative form of this invention wherein a center drive shaft is constantly driven and the two hollow drive shafts journalled thereon are controllably driven by the two spring-pressed friction clutch plates.

More specifically, it is an object to provide a split driving pulley having two sections with a pair of friction clutch plates resiliently held against the outer surfaces thereof and resiliently holding said two sections together but permitting spreading of said two sections when the driving belt is controllably tensioned and also provided with controllable means for disengaging either or both of said clutch plates.

These and other objects and advantages of this invention will more fully appear from the following description made in connection with the accompanying drawings wherein like reference characters refer to the same or similar parts throughout the several views, and in which:

Fig. 1 is a top plan view of a driving mechanism embodying our invention;

Fig. 2 is a longitudinal vertical sectional view showing our driving mechanism with the mounting brackets being shown partially in elevation;

Fig. 3 is a transverse vertical sectional view taken substantially along the line 3—3 of Fig. 2; and Fig. 4 is a fragmentary longitudinal vertical sectional view showing an alternative form of our invention.

As best shown in Fig. 2 of the drawings, we provide a driving mechanism which, in the form shown, is adapted for use with belt and pulley driving connections and, more particularly, for use with a main V-belt drive.

Our driving connection consists in a pair of elongated hollow tubular drive shaft sections respectively designated by the numerals 9 and 10 and journalled on any suitable means such as the pair of bushings 11 and 12 respectively carried by a pair of mounting brackets 13 and 14 which are securely anchored to any suitable support. An elongated supporting rod 15 extends through the two hollow drive sections 9 and 10 and maintains the same in longitudinally aligned end to end relation, the inner ends of said shaft sections 9 and 10 being spaced apart for purposes that will be brought out hereinafter. The diameter of said supporting rod 15 with respect to the inside diameter of said hollow shaft sections 9 and 10 is such that sufficient annular space is provided between said rod and said sections to permit a pair of thin bushings 16 and 17 to be interposed between the end portions of said shaft sections and the adjacent portion of the rod 15 to positively maintain said shaft sections in concentric rotatable relation around said rod.

A main driving pulley is, in the form of our invention shown in Fig. 2, formed in two sections 18 and 19, both of which are journalled on shaft 15 for idling rotation thereon. The two pulley sections 18 and 19 combine to form a split pulley designated by the letter P. A pair of friction clutch plates 20 and 21 have suitable grooved shipper collars 20a and 21a respectively fixed thereto with the inside diameters of said shipper collars being respectively splined for longitudinal shifting movement on the two hollow shaft sections 9 and 10. Suitable high-friction material, such as the annular clutch rings 20b and 21b are, in the form shown respectively fixed to the inner faces of said clutch plates 20 and 21 to maintain driving engagement with the outer faces of the respective pulley sections 18 and 19. Suitable means for yieldably maintaining driving engagement between the clutch plates 20 and 21 and the respective pulley sections 18 and 19 are provided, such as the resilient compression springs 22 and 23 respectively held in compression by the collars 24 and 25 which are fixed to the respective shaft sections 9 and 10 as by being set screwed thereto.

The shipper collars 20a and 21a have shipper forks 26 and 27 respectively engaged therein and a pair of elongated offset actuating levers 28 and 29 are respectively fixed to said forks and are pivotally mounted on a common pivot pin 30 and extend outwardly from said forks in crossed-over relation at said pivot to the control handles 28a and 29a and are respectively held in the desired relation by the spring-pressed dogs 31 and 32 releasably engaged with the toothed anchoring members 33 and 34, best shown in Fig. 1. A V-belt 35 is trained about pulley P and is driven by any suitable source of rotary power such as the motor 36 and pulley 37 driven thereby. A pair of driven pulleys, respectively designated by the numerals 38 and 39, are fixed to the outer end portions of hollow shaft sections 9 and 10 as by being set-screwed thereto, and the ends of rod 15 are positively held against longitudinal shifting movement by any suitable means such as the nuts and washers 40 and 41.

The following is a description of the form of our invention illustrated in Figs. 1 and 2 wherein the pulley sections 18 and 19 are freely journalled for rotation on the central portion of rod 15. The springs 22 and 23 respectively engage the outer end portions of the splined shipper collars 20a and 21a to resiliently hold the respective friction rings 20b and 21b in frictional driving engagement with the respective sections 18 and 19 so that rotation of the pulley P will produce simultaneous rotation of the two shaft sections 9 and 10 and driven pulleys 38 and 39. However, if one of the driven pulleys 38 or 39 is to be stopped, the shipper fork on that side of the driving pulley P is actuated to shift the respective collar and clutch plates away from the respective pulley section. A pair of stop collars 42 and 43 are respectively fixed to the inner end portions of hollow shaft sections 9 and 10 as by being set-screwed thereto and engage the outer surfaces of the respective pulley sections 18 and 19 to limit the spreading of said sections and maintain the driving connection thereof with the V-belt 35. As indicated in Fig. 2, the shipper collar and adjacent portion of the clutch plate in each case is recessed to receive said stop collars 42 and 43. Obviously, if there is more resistance to rotation produced on one of the driven pulleys 38 or 39 and that resistance is sufficient to produce slippage of the friction clutch plate which drives the same, said two pulleys 38 and 39 may rotate at different speeds, thus producing a differential driving action therebetween and particularly adapting the driving unit for use with power lawn mowers where one wheel must be driven faster than the other when the lawnmower is being turned to proceed around a corner or the like. The resilient, yieldable springs 22 and 23 normally hold the clutch plates 20 and 21 in driving engagement with the two pulley sections and hold the two pulley sections in engaged, side by side relationship. Obviously, tensioning of the belt 15 by any suitable means such as by shifting the driving motor and pulley 37 away from the pulley P, will also produce spreading of the pulley sections and thus permit the driving ratio between pulley 37 and pulley P to be adjustably varied. A suitable control screw and crank mechanism 44 is provided for shifting motor 38 on a guiding track 45 to vary the tension on belt 35.

An alternative form of our invention is illustrated in Fig. 4 wherein a split pulley designated by the letter S is splined to the central supporting rod 45. The pulley S has a pair of sections 46 and 47 which are identical to sections 18 and 19, except that said sections are splined to the central portion of shaft 45 which is otherwise identical with shaft 15, said spline connection being designated by the numeral 48. All of the other elements of the driving assembly are identical in construction and operation to the elements described in the form of our invention shown in Fig. 2 and bear similar numbers to the numbers designated for the respective parts in said first described form. It will be seen that the operation of this modified form of our invention will provide a constantly driven central supporting rod 45 which is not capable of being disengaged from the pulley S so that three drives could easily be provided with this minor modification of our first described driving connection while still permitting the control individually or simultaneously of the hollow drive shafts 9 and 10.

It will be seen that we have provided a simple and inexpensive, yet highly efficient, driving connection wherein individual control and differential driving of a pair of driven elements is provided. Also, in the form of our invention illustrated in Fig. 4, it will be seen that a constantly driven shaft is provided with a pair of individually controllable rotary driven elements.

It will, of course, be understood that various changes may be made in the form, details, arrangement and proportions of the parts without departing from the scope of this invention which, generally stated, consists in the matter shown and described herein and set forth in the appended claims.

What we claim is:

1. A driving mechanism comprising an elongated supporting rod, a pair of shafts respectively journalled thereon for rotation on a common axis through said rod, the inner ends of said shafts being spaced apart, a driving pulley mounted on said rod between said two shafts, a pair of shiftable friction driving clutches respectively interconnecting each of said shafts with said driving pulley, resilient means normally urging each of said clutches into engagement, and control means for individually disengaging said shiftable clutches.

2. The structure set forth in claim 1, and said pulley being of the split V-belt type to form two separate driving sections respectively engaged by said friction clutches and permitting the driving ratio of power transmitted by said pulley to be varied by spreading said pulley elements apart against the yieldable force exerted by said resilient means.

3. A driving mechanism comprising an elongated supporting rod, a pair of hollow shafts respectively journalled on said rod for rotation on a common axis therethrough, the inner ends of said shafts being spaced apart, a split driving pulley forming a pair of separate sections mounted on said rod between said two shafts with the sections thereof adapted to be spread apart longitudinally of said two sections, a pair of friction driving clutch elements respectively interconnecting each of said shafts with said pulley sections, and resilient means normally urging the driving elements into engagement with the outer portions of said pulley sections to resiliently hold said pulley elements together and maintain driving engagement between said pulley elements and said shaft sections.

4. A driving mechanism comprising an elongated supporting and mounting rod, a pair of hollow shaft elements respectively journaled on said rod for rotation on a common axis therethrough, the inner ends of said shaft elements being longitudinally spaced apart, a driving wheel mounted on the center portion of said rod between the inner ends of said shaft elements, a pair of friction clutch discs mounted on opposite sides of said driving wheel and respectively splined to the inner ends of said hollow shaft elements and having friction driving connections with the respective side faces of said driving wheel, said supporting and mounting rod extending outwardly beyond the outer ends of said hollow shaft elements, resilient means normally urging said discs into driving connection with respect to adjacent face portions of said wheel, control means for shifting said discs longitudinally outwardly of said shaft elements to disconnect the driving connection between said discs and said wheel, and a pair of driven elements respectively fixed to the outer ends of said hollow shaft elements.

References Cited in the file of this patent

UNITED STATES PATENTS

| 877,022 | Waldorf | Jan. 21, 1908 |
| 1,006,938 | Harriss | Oct. 24, 1911 |
| 1,190,285 | Gouldbourn | July 11, 1916 |
| 1,252,550 | Champney | Jan. 8, 1918 |
| 1,276,379 | Lundquist | Aug. 20, 1918 |
| 1,887,635 | Gehres et al. | Nov. 15, 1932 |
| 2,000,593 | Happel | May 7, 1935 |
| 2,203,149 | Hoover | June 4, 1940 |
| 2,379,901 | Hare | July 10, 1945 |
| 2,574,617 | Bryant | Nov. 13, 1951 |

FOREIGN PATENTS

| 137,953 | Great Britain | Jan. 29, 1920 |